United States Patent [19]

Deman

[11] 4,031,326
[45] June 21, 1977

[54] TELEPHONE ARTERY WITH MULTIPLE ACCESS POINTS AND TELEPHONE NETWORKS WITH SUCH ARTERIES

[75] Inventor: Pierre Deman, Paris, France

[73] Assignee: Thomson-CSF, Paris, France

[22] Filed: Oct. 30, 1975

[21] Appl. No.: 627,456

[30] Foreign Application Priority Data
Oct. 31, 1974   France .............................. 74.36491

[52] U.S. Cl. .......................... 179/15 FS; 179/2.5 R
[51] Int. Cl.² ............................................ H04J 1/00
[58] Field of Search ........ 179/15 FS, 15 FD, 2.5 R; 325/49, 50, 137, 184

[56] References Cited
UNITED STATES PATENTS

| | | | |
|---|---|---|---|
| 3,364,311 | 1/1968 | Webb | 179/15 FS |
| 3,733,438 | 5/1973 | Haley | 179/15 FD |
| 3,809,816 | 5/1974 | Reed | 179/15 FD |
| 3,882,279 | 5/1975 | Duval | 179/15 FD |

Primary Examiner—Kathleen H. Claffy
Assistant Examiner—Joseph A. Popek
Attorney, Agent, or Firm—Cushman, Darby & Cushman

[57] ABSTRACT

The artery comprises for two-way transmission of the telephone signals first and second transmission channels coupled together at one end of the artery. In each one of a plurality of geographical points, a multiplexing-demultiplexing switching device is coupled to the artery for selectively frequency translating low frequency input channels and inserting them in vacant positions of the group of multiplexed channels transmitted by the first transmission channel, and selectively extracting from the second transmission channels the corresponding return speech signals and transposing than to low frequency, without complete demultiplexing of the group of multiplexed signals transmitted by the second transmission channel. This system allows in particular telephone communication through the artery between two subscribers whose lines may be connected to two such switching devices.

6 Claims, 5 Drawing Figures

TELEPHONE ARTERY WITH MULTIPLE ACCESS POINTS AND TELEPHONE NETWORKS WITH SUCH ARTERIES

The present invention is concerned with the field of telephony utilising single-sideband multiplexing and a premodulation frequency which is such as to make it possible to form multiplex groups of practical interest, from which any channel may be selectively translated into the pass-band of the premodulation filter by means of a mixer receiving those groups and an appropriate carrier current, those groups being limited to all or part of a set of channels, which will be referred to as the maximum switching group, or in abbreviated form MSG.

The invention has for its object to provide a two-way telephone artery comprising at each one of m points distributed along this artery, including at least an intermediate access point, a multiplexing-demultiplexing switching device permitting switching of subscribers' telephone channels to the various telephone channels of a multiplex group, consisting of all or part of an MSG, carried by the artery, for the purpose of establishing telephone connections involving subscribers of groups connected to the artery by such multiplexing-demultiplexing switching devices, or more briefly switching devices.

According to the invention, there is provided a two-way telephone artery, having first and second terminals, for transmitting in each direction channels forming part of a predetermined multiplexed set of $g$ channels in a telephone system using premodulation and single sideband frequency multiplexing, said set of channels being such that any of its channels may be selectively translated into the pass-band of a premodulation filter by means of a mixer receiving said set and a carrier current associated with this channel, said artery having first and second transmission channels for transmitting telephone communications in first and second directions, and M access points, M at least equal to 3, at $m$ of which, $1 \leq m \leq M$, $m$ multiplexing and demultiplexing switching devices are respectively coupled to said artery for selectively inserting telephone channels in the group of channels transmitted by said first transmission channel at vacant positions of said set and selectively extracting telephone channels from the group of channels transmitted by said second transmission channel, the inserted and extracted telephone channels occupying the same frequency bands in said transmission channels, the $i^{th}$ switching device starting from said first terminal ($i = 1, 2 \ldots m$) comprising $p_i$, $1 \leq p_i \leq g$ telephone channel circuits, each of said telephone channel circuits comprising first and second branches, said first branch comprising, in series, an input mixer having a first input, forming a first input of this channel circuit, for receiving a low frequency channel, and a carrier current input for receiving a current at the premodulation frequency, a premodulation filter having an output, and an output mixer having a first input coupled to said output of said premodulation filter, a carrier current input, and an output forming a first output of this channel circuit, said second branch comprising in series an input mixer having a first input forming a second input of this channel circuit and a carrier current input, a premodulation filter having an output, and an output mixer having a first input coupled to said output of said premodulation filter of said second branch, a carrier current input for receiving said current at the premodulation frequency and an output forming a second output of this channel circuit, each of said telephone channel circuits further comprising a digitally controllable variable frequency generator having an output connected to the carrier current inputs of said output mixer of said first branch and of said input mixer of second branch, said $i^{th}$ switching device further comprising, at least for $i < m$, a regrouping coupling device having inputs and an output, inserted by an input and its output in said first transmission channel, and having $p_i$ other inputs connected respectively to the first outputs of said $p_i$ telephone channel circuits, and a distribution coupling device having an input and outputs, inserted by its input and an output in said second transmission channel, and having $p_i$ other outputs connected respectively to the second inputs of said $p_i$ telephone channel circuits, said artery further comprising at said first terminal a terminal arrangement having an input coupled to said first transmission channel and an output coupled to said second transmission channel; the first outputs and second inputs of the $p_m$ channel circuits of the $m^{th}$ switching device being respectively coupled to said first and second transmission channels at said artery second terminal through regrouping and distribution coupling devices respectively.

According to the invention, there is further provided a telephone network comprising at least one artery as defined hereinabove.

The invention will be more readily understood from the following description and from the drawings relating thereto, in which.

Figure 1:
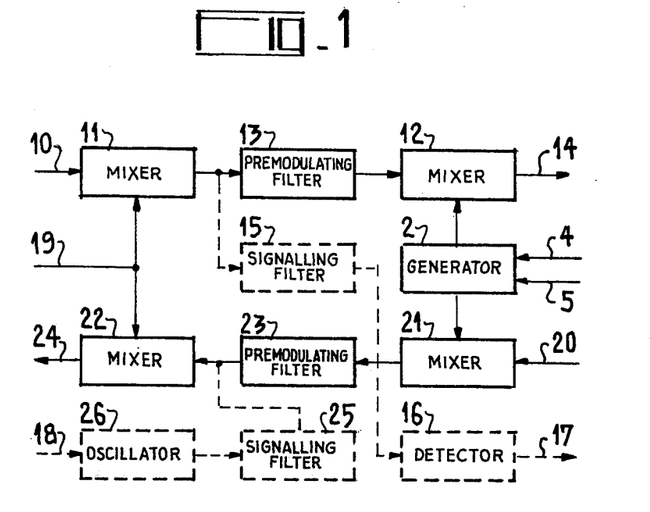
FIG. 1 is the diagram of a channel circuit comprising a single programmable generator which can be used in a switching device of an artery according to the invention.

However, there are shown in chain lines elements which may be associated with the channel circuit in the opposite case.

The channel circuit comprises an input 10 feeding a mixer 11 followed by a premodulation filter 13, which feeds a second mixer 12 feeding an output 14 of the channel circuit.

The circuit comprises a second arrangement which is similar to the first and in which the elements are denoted by numbers increased by 10 in relation to the corresponding elements of the first.

The mixers 11 and 22 receive the premodulation frequency $F_Q$ supplied at an input 19, while the mixers 12 and 21 are fed by a programmable generator 2. This controlled generator is of the feedback loop type comprising a frequency divider having a variable and controllable divisor N, which receives at one input 5 of the circuit a fixed reference frequency $F_o$ and produces a frequency $N.F_o$. The generator 2 is provided with an input 4 for controlling the value N of the divisor and therefore the supplied frequency; the input 4 normally comprises two or more wires.

There are shown in chain lines the following elements which may be used for telephone channels with each of which there is associated a signalling channel.

The first branch comprises at the output of the mixer 11 a second filter 15 which extracts the call frequency (which is, for example, 0 or 3.825 kc/s at low frequency) transposed to the premodulation frequency or shifted therefrom by 3.825 kc/s, followed by a detector 16, the output of which is denoted by 17.

The second branch comprises at the input of the mixer 22 a second filter 25 identical to the filter 15 and preceded by an oscillator 26, at the call frequency transposed by a value equal to the premodulation frequency, and comprising a control input 18.

The channel circuit of FIG. 1 is intended to be used as follows:

It receives at its input 10 a low-frequency telephone channel, brings it to the premodulation frequency by means of the mixer 11 and the filter 13 and supplies it, again transposed by means of the mixer 12, at its output 14. Its input 20 receives the "return" channel corresponding to the outgoing channel supplied by the output 14 and transposed to the same frequency. In extracts it at premodulation frequency by means of the mixer 21 and the filter 23, and delivers it, after retransposition to the low frequency, at its output 24.

The input 4 is intended to be connected to a control logic circuit which determines the frequency translations performed by means of the mixers 12 and 22; if they exist, the output 17 and the input 18 are connected to this same control logic circuit for the detection and the control of the insertion of the signalling.

It will be noted that the two branches differ only in respect of the elements for the extraction and insertion of the signalling and the direction of circulation of the signals.

The channel circuit of FIG. 1 considered per se is a multiplexing-demultiplexing circuit for a telephone channel having a second modulation frequency which is programmable by utilisation of the generator 2 instead of a second-modulation frequency distribution.

A transmission channel board intended for channel multiplexing-demultiplexing and comprising a programmable generator such as the generator 2 has been proposed by the Applicants in the Patent application relating to "A channel board for telephony transmission equipment using single sideband multiplexing", filed on the 8.27.75 under No. 608,241.

In practice, the channel circuit used in the present invention may or may not be provided wholly or in part on a channel board.

It is possible to use for the remote control of the frequency of the generator 2 means which are proposed in the aforesaid Patent application, that is to say, to provide in association with the said generator a shift register which stores the remote control bits determining the value of the divisor N; the input 4 then comprises two wires, one of which supplies the signals and the other the shift pulses for the register.

Figure 2:
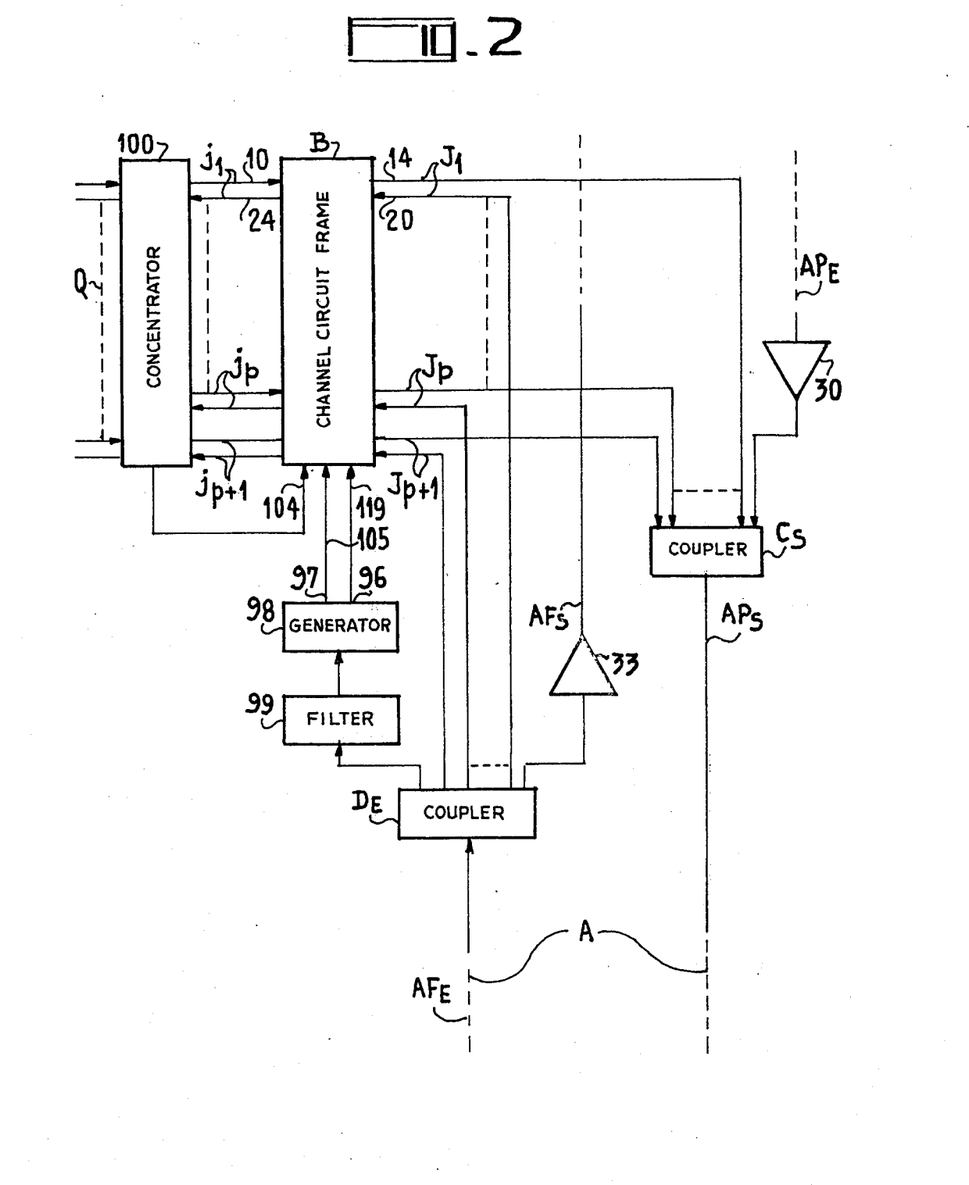
FIG. 2 illustrates a switching device and its mode of insertion between a subscriber concentrator and a telephone artery having multiple access points.

FIG. 2 illustrates a switching device and its mode of connection between a subscriber concentrator and a two-way telephone artery A according to the invention, carrying a multiplex group, for the purpose of effecting the two-way connection to the artery A of subscribers' channels which are supplied thereto by the concentrator.

The two-way artery A comprises in this example a centripetal two-conductor cable AP and a centrifugal two-conductor cable AF, the words "centripetal" and "centrifugal" referring to a control centre at which the artery terminates at its first extremity.

It is assumed that the channels carried by the artery A consists wholly or in part of the channels of a group which will be referred to as the "maximum switching group" or MSG in abbreviated form, and that the premodulation frequency $F_Q$ used is higher than the highest translation frequency, $F_Q$, in relation to the low frequency, of the channels of the MSG. The ratio $F_Q/F_M$ employed will preferably be sufficiently high for the intermodulation products, which may be troublesome, to be of a sufficiently high order; a sufficient order of magnitude is 2.5 to 3. However this ratio may advantageously be chosen higher provided this does not raise difficulties in making the premodulation filter more particularly so that the gain variation in the pass band should not be excessive.

The MSG is so defined as to take account of the premodulation frequency and of the ranges which can be covered by the generator 2 having regard to its degree of improvement.

In order to fix ideas, there will be described an example which can readily be put into practice with the present technology. All the frequencies will be indicated in kc/s.

Premodulation frequency 2500.

Filters 13 and 23 : quartz filters passing the band 2500.3 − 2503.4 resulting from the modulation.

MSG : consisting of the first two groups of 60 channels of a standardised system.

It will be assumed by way of example that there are concerned two secondary groups covering the bands from 60 to 300 kc/s and from 312 to 552 kc/s, the second not being transposed and the first being transposed with inversion of the spectrum.

It will also be assumed in this example that the group carried by the artery A is an MSG.

There will be denoted by $P_i$ ($i = 1, 2 \ldots 120$), the frequencies having to be supplied by a programmable generator for transposing a premodulated channel to a corresponding carrier frequency $F_i$ of an MSG or vice versa.

The values of $P_i$ are $(548-g)4, g = 1, 2 \ldots 60$, i.e., a range of 1952 − 2188 for the untransposed group, and $(701-g)4, g = 1, 2 \ldots 60$, i.e., a range of 2800 to 2564 for the first group.

These frequencies make it possible to extract without ambiguity (at premodulation frequency) any channel of an MSG applied to the input 20 of a channel circuit by means of the modulator 21 and the filter 23 and to retranspose is to low frequency by means of the modulator 22. Conversely, a low-frequency channel applied to the input 10 can be transposed to the frequency $F_j$ by means of the branch 10-11-13-12 of the channel circuit.

It will also be assumed that, in addition to a complete MSG, the artery A carries a semaphore channel occupying the band from 52 to 56 kc/s, for the transposition of which a corresponding frequency $P_s$ can additionally be supplied by the generator 2 of the channel circuits.

This semaphore channel can without incovenience be added to the MSG since the total group formed by the MSG and the semaphore channel complies with the condition of selective translation of any channel of the total group into the pass-band of the premodulation filter by means of a mixer receiving the total group and a carrier current associated with the channel to be translated. In addition, the carrier current $P_S$ associated with the semaphore channel can easily be supply by the generator 2 of the channel circuits.

Consequently, the channel circuits which are used in the embodiment with the switching device which has just been described are channel circuits as illustrated in solid lines in FIG. 1, which do not comprise the signalling devices illustrated in chain lines in the said figure.

Finally, the artery carries into the centrifugal direction a carrier current at 48 kc/s.

The couplers which will be mentioned with reference to the figures which follow are couplers consisting of an amplifier fed by input resistors for a regrouping, an amplifier feeding output resistors for a distribution, or an amplifier fed by resistors and feeding resistors for a regrouping and distribution coupler.

These couplers are aperiodic, i.e., have a substantially constant gain, in the whole of the frequency band in which the useful signals which their supply appear. In addition the gain characteristic of then amplifier is used for the elimination of parasitic signals, such as those resulting from the additive frequency conversions ($F_o + P_i$) effected in the mixer 14 of the channel circuits, the useful signal being obtained through subtractive frequency conversions in those mixers.

In FIG. 2, there are denoted by $AP_E$ and $AP_S$ the input and output sections of the cable AP, and likewise by $AF_E$ and $AF_S$ the input and output sections of the cable AF.

The switching device comprises a frame B including $(p+1)$ channel circuits $V_i$, the last of which is a semaphore channel circuit identical to the telephone circuits, p normally being distinctly lower than 120.

The input 10 and the output 24 of each channel circuit $V_i$ constitute a junction $j_i$, and the input 20 and the output 14 of each channel circuit $V_i$ constitute a junction $J_i$.

The junctions $j_i$ are connected to a subscriber concentrator, 100 which effects the two-wire/four-wire passage between the subscribers' lines and the junctions, and the necessary low-frequency filtering. The inputs 20 of the junctions $J_i$ are fed in parallel by $(p+1)$ outputs of a distribution coupler $D_E$ having $(p+3)$ outputs, which is fed by the cable $AF_E$, of which the $(p+2)^{th}$ output is connected to the output amplifier 33 feeding the cable $AF_S$, and of which the $(p+3)^{th}$ output feeds a narrow-band filter 99 which extracts the frequency 48 kc/s.

The outputs 14 of the junctions $J_i$ are connected to $(p+1)$ inputs of a regrouping coupler $C_S$, a $(p+2)^{th}$ input of the coupler being connected to the cable $AP_E$ by an amplifier 30 and its output being connected to the cable $AP_S$.

The frequency control inputs of the channel circuits form a bundle of lines 104 connected to a multiple output of the concentrator 100. The inputs 5 of the channel circuits are fed in parallel by a single cable 105 and their inputs 19 in parallel by a cable 119.

The filter 99 feeds a frequency generator 98 which produces from the frequency of 48 kc/s the frequency $F_o$, $F_o = 4$ kc/s $= (48/12)$ kc/s and from the latter the frequency $F_Q = 2500$ kc/s $= (F_o \times 625)$ kc/s. These two frequencies, of which the first is the reference frequency of the generators of the channel circuits and the second the premodulation frequency, are supplied to outputs 97 and 96 respectively of the device 98.

The output 97 of the device 98 feeds the cable 105 and the output 96 feeds the cable 119.

Both the mixers 11 and 12 thus receive the premodulation frequency $F_Q$. Each of the generator 2 of the telephone circuits can take, according to choice, one of the frequencies $P_1$ to $P_{120}$, but their frequencies are always different from one another. The generator 2 of the circuit $V_{p+1}$ has the frequency $P_S$ corresponding to the semaphore channel.

The arrangement of FIG. 2 which comprises the concentrator 100 and the switching device, whose inputs are connected to the cable sections $AP_E$ and $AF_E$ and whose outputs are connected to the cable sections $AF_S$ and $AP_S$, will be referred to as a decentralised section SD.

In a telephone call involving a subscriber $Q_o$ connected to the section SD and a subscriber $Q'_o$ of an identical decentralised section SD' also connected to the artery A, the concentrator 100 of the section SD connects the subscriber $Q_o$ to a free junction $j_k$ ($k = 1, 2 \ldots p$) of the switching device and assigns a frequency $P_x$ corresponding to a free channel of frequency $F_x$ of the MSG carried by the cable AP to the generator 2 of the channel circuit $V_k$. The speech signals of $Q_o$ travel along the section 10–14 of the channel circuit $V_k$, which transposes them to the frequency $F_x$ and transmits the transposed channel to the cable $AP_S$ through the coupler $C_S$.

The telephone circuit with the subscriber $Q'_o$ is closed in the section SD through the cable $AF_E$, the coupler $D_E$, the input 20 of the junction $J_k$, the output 24 of the junction $j_k$ and the concentrator 100.

In FIG. 3, there is again shown the artery A of FIG. 2 with its cables AP and AF, along which a number of decentralised sections $SD_1, SD_2 \ldots SD_m$ are connected by their switching device, the section $SD_1$ being the closest to the transit centre at which the artery A terminates. Each of two sections, $SD_1$ and $SD_h$, is represented as a whole by a block whose inputs are the inputs Q of its subscriber concentrator and the cable inputs $AF_E$ and $AP_E$, and whose outputs are the cable outputs $AF_S$ and $AP_S$.

Figure 3:
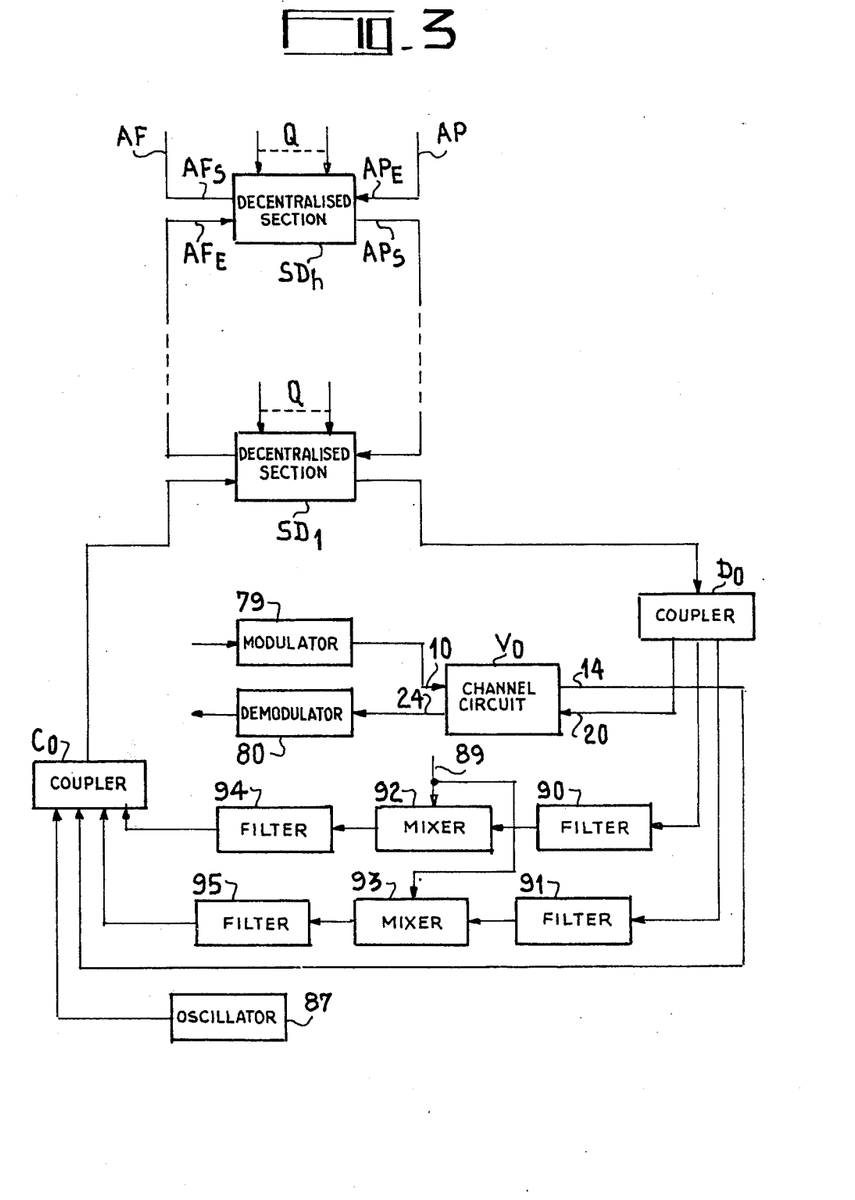
FIG. 3 is the diagram of an artery having multiple access points for the establishment of connections between subscribers of two groups connected to a common artery having multiple access points.

In this example, it is assumed that the cable terminates at section $SD_m$ (not shown). Consequently the regrouping and distribution coupling devices at this section have no input $AP_E$ and no output $AF_S$.

At the transit centre, which is here reduced to a control centre routing the communications between subscribers connected to two different decentralised sections, and which may be situated in the same geographical location as $SD_1$, the cable AP feeds a distribution coupler $D_o$ comprising two outputs, of which the first is connected to the input 20 of a channel circuit $V_o$ identical to those of the decentralised sections. The generator 2 of the circuit $V_o$ is continuously at the frequency $P_S$ permitting this circuit to receive the semaphore channel, and restores the latter to low frequency at its output 24.

The output 24 of the channel circuit $V_o$ is connected through a digital-analog demodulator 80 to the control logic circuit of the control centre. This circuit has an output connected to the input 10 of the channel circuit through a corresponding modulator 79. The demodulator 80 has an input low-frequency filter.

The second and third outputs of the coupler $D_o$ are connected respectively to the input of two filters 90 and 91 which pass respectively the bands 60–300 kc/s and 312–552 kc/s, and the outputs of the two filters are connected to two mixers 92 and 93 receiving at a common input 89 a frequency of 612 kc/s locally produced by a generating device (not shown). The mixers 92 and 93 are respectively followed by two filters 94 and 95 which are identical to 91 and 90 respectively. The set 90, 91, 92, 93, 94, 95 therefore supplies the MSG carried by the cable AP retransposed into its own band, but each channel of the first secondary group of the incident MSG is transposed into the second and vice versa.

The centre comprises an oscillator 87 operating at 48 kc/s. The output 14 of the channel circuit $V_o$, the outputs of the filters 94 and 95 and that of the oscillator 87 are connected to the four inputs of a regrouping coupler $C_o$ whose output is connected to the cable AF.

It will first of all be noted that the frequency of 48 kc/s has only to circulate along the cable AF in order to be extracted in all the sections SD as indicated in FIG. 2.

The semaphore channel of carrier frequency $F_S$ transmitted by the cable AP is used. On a time-sharing basis, in accordance with a conventional interrogation-response technique, or a technique of frame transmission with beginning-of-frame signal, of all the service communications of the decentralised sections to the control centre, via the semaphore channel circuits of the decentralised sections, the cable AP, and the circuit $V_o$ of the transit centre. The generators 2 of all these semaphore channel circuits have the frequency $P_S$. Likewise, the communications from the control centre to the concentrators 100 of the decentralised sections take place via the branch 10–14 of the circuit $V_o$, the cable AF and the branches 20–24 of the semaphore channel circuits of the decentralised sections.

Assuming now that a subscriber $Q_o$ of a section $SD_i$ asks for the subscriber $Q'_o$ of a section $SD_k$, the concentrator 100 of the section $SD_i$ transmits his request through the semaphore channel to the control logic circuit of the control centre. If the subscriber $Q'_o$ is free, the control logic circuit indicates to the concentrator 100 of section $SD_i$ a) a free channel circuit $V_{x(i)}$ of the section $SD_i$, and b) a frequency $P_y$ corresponding to a free channel $F_y$ of the MSG passing through AP, to which there corresponds, a free channel $F_{121-y}$ of the MSG carried by the cable AF. On the other hand, it signals to the concentrator of the section $SD_k$ a free channel circuit $V_{z(k)}$ of this section and indicates thereto the frequency $P_{121-y}$. In the section $SD_i$, the concentrator connects the subscriber $Q_o$ to the junction $j_{x(i)}$ and assigns the frequency $P_y$ to the generator 2 of the channel circuit $V_{x(i)}$. The concentrator 100 of the section SD' connects the subscriber $Q'_o$ to the junction $j_{z(k)}$ of the corresponding switching device and assigns the frequency $P_{121-y}$ to the generator 2 of the channel circuit $V_{z(k)}$. The communication can take place. When $Q_o$ speaks, the signals transposed by $V_i$ are transmitted along the cable AP by the channel $F_y$, transposed to the channel $F_{121-y}$ in the transit centre, and received at this frequency by the channel circuit $V_{z(k)}$, which re-retransposes them to low frequency. Conversely, when $Q'_o$ speaks, the travel along the artery takes place at the frequency $F_{121-y}$ by the cable AP ant at the frequency $F_y$ by the cable AF.

The described arrangement makes it possible to establish simultaneously 60 communications between the subscribers connected to the concentrator. However, the total number of telephone channel circuits of the decentralised sections may exceed this number to an extent depending upon the density of the traffic; for example, it may reach 100.

For example, assuming that the decentralised sections are of equal importance, there may be 10 decentralised sections with 10 telephone channel circuits, each section being connected by its concentrator to 50 subscribers.

Figure 4:
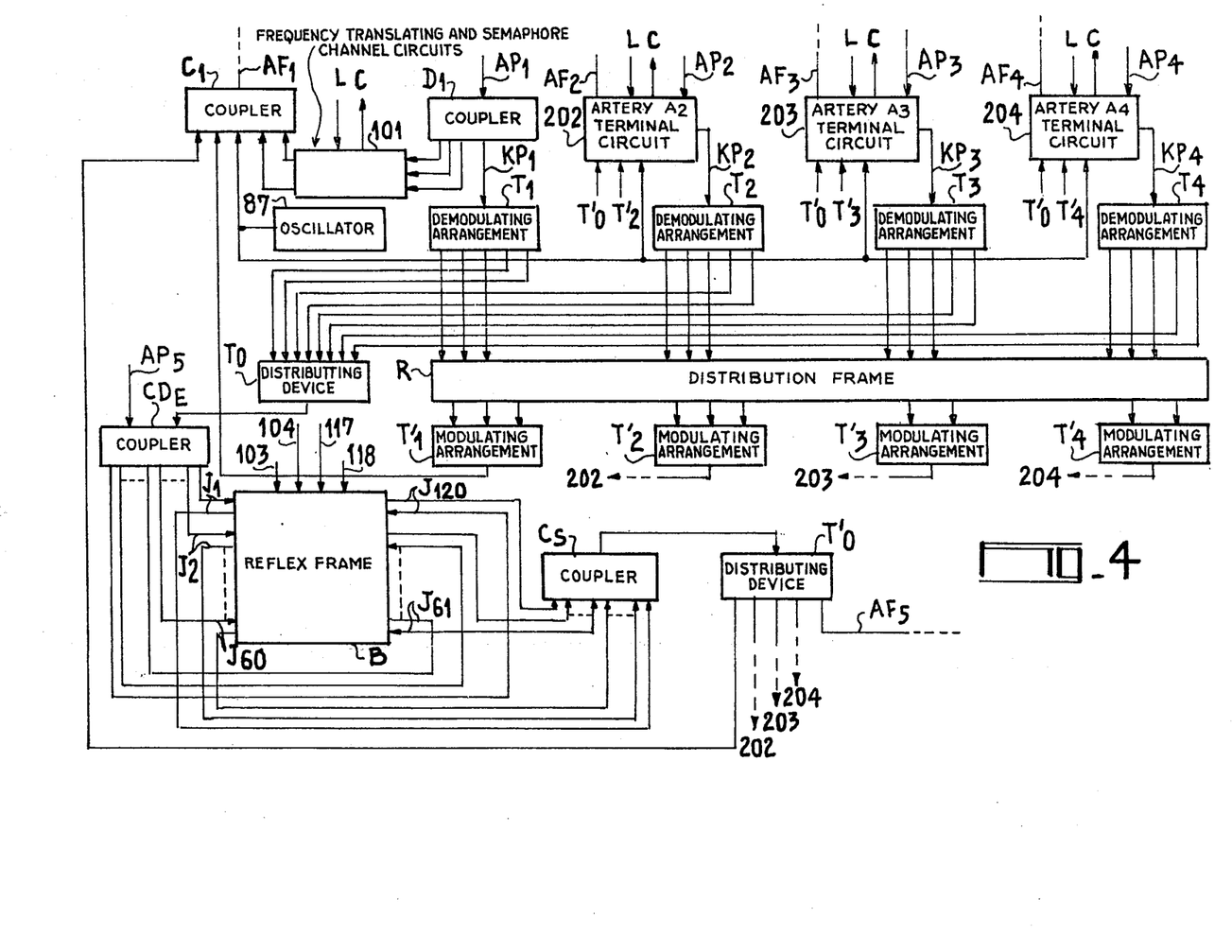
FIG. 4 is the diagram of a regional network comprising a number of arteries having multiple access points, as well as other arteries, and a transit centre controlling the routings between these arteries.

FIG. 4 is the diagram of a regional network. Five arteries $A_1$ to $A_5$, which are represented in the figure only by the extremities $AF_i$ and $AP_i$ ($i = 1, 2 \ldots 5$) of their centrifugal and centripetal cables, lead to the transit centre of the main town of a district. The three arteries $A_1$, $A_2$, $A_3$ are similar to the artery A of FIG. 2 and have the same capacity; they also utilise a 52–56 kc/s semaphore channel outside the group. The artery $A_4$ does not have multiple access points; its capacity is of one secondary group (60–300 kc/s) with, in addition, a semaphore channel in the 52–56 kc/s band; in the centripetal sense, it carries telephone channels emanating from subscribers from the main town in the district itself, these channels being multiplexed for inter-arterial traffic, by means of a multiplexing section identical to the decentralised sections, not comprising an input $AP_E$ and an output $AF_S$, but with 60 telephone channel circuits. The traffic between the subscribers of the main town of the district is serviced by an independent arrangement. The artery $A_5$ has a capacity of two primary groups, namely the first two primary groups (60–156 kc/s) of a 60–300 kc/s secondary group, with independent signalling channels for the different telephone channels; $A_5$ is an inter-regional artery and, in the centripetal sense, carries telephone channels emanating from subscribers outside the region.

As an extension to the case of FIG. 3, each of the arteries $A_1$, $A_2$, $A_3$ comprising $m_1$, $m_2$ and $m_3$ decentralised sections respectively is utilised not only for the traffic passing through two decentralised sections of this artery, but also for the traffic with the subscribers served by the other two, and with the artery $A_4$ and for the external traffic (artery $A_5$).

The connections between $A_4$ and $A_5$ effect the exchanges between the main town of the district and the outside.

The cable $AP_1$ feeds a distribution coupler $D_1$ and the cable $AF_1$ is fed by a regrouping coupler $C_1$. The coupler $D_1$ has connections identical to those of the coupler $D_o$ of FIG. 3, and the coupler $C_1$ has connections identical to those of coupler $C_o$ of FIG. 3, all the corresponding elements, with the exception of the oscillator 87 (FIG. 3), being represented by a block 101 having four inputs and three outputs; two inputs of 101 connect $D_1$ to the frequency-translating arrangement (90-91-92 and 93-94-95, FIG. 3), one input connects $D_1$ to the input 20 of a semaphore channel circuit ($V_o$, FIG. 3), and the fourth input connects the control logic circuit LC to the semaphore channel modulator (79, FIG. 3). Two outputs of 101 connect the frequency-translating arrangement to the coupler $C_1$; the third output connects the semaphore channel modulator (80, FIG. 3) to the central logic element.

The oscillator 87 (FIG. 3) operating at 48 kc/s also feeds the coupler $C_1$, but is represented separately from the circuit 101, because it is also used for other arteries $A_2$, $A_3$ and $A_4$. The coupler $D_1$ has an additional output $KP_1$ and the coupler $C_1$ two additional inputs, the connections of which will hereinafter be indicated.

The assembly comprising a coupler identical to $D_1$, a circuit identical to the circuit 101 and a coupler identical to $C_1$ is represented as a whole by an "artery $A_2$ terminal circuit" 202, the input $AP_1$ and the output $AF_1$ of this assembly being replaced by $AP_2$ and $AF_2$. An identical set of circuits 103 is connected to $AP_3$ and $AF_3$ respectively. Another identical set of circuits 204, is connected to $AP_4$ and $AF_4$; $KP_2$, $KP_3$ and $KP_4$ are outputs of the circuits 202, 203 and 204 corresponding to the output $KP_1$ of the circuit 201. The multiplexing section of the artery $A_4$ also uses the 48 kc/s frequency supplied by the oscillator 87 for obtaining the reference and premodulation frequencies of its channel circuits.

It will be assumed that it may be concluded from the statistics that groups of 12 channels can normally be routed from each of the arteries $A_1$, $A_2$, $A_3$, $A_4$ to the other three.

Such statistics could not be utilised where the artery $A_5$ is concerned, even if its capacity were greater, because, although the first four operate with semaphore channels in this example, this is not the case with the artery $A_5$.

When the control logic circuit is connected to each of the semaphore channels $V_o$ of the arteries $A_1$ to $A_4$, it assigns the frequencies of the generators 2 of these channel circuits of the decentralised sections and of the multiplexing section of $A_4$ in such manner that the channels serving for the exchanges between arteries are, by priority, those of the primary groups $GP_1$, $GP_2$ and $GP_3$ (300 to 156 kc/s) of the first secondary group (60–300 kc/s) of the MSG carried by $A_1$, $A_2$ and $A_3$ and of the single secondary group (60–300 kc/s) carried by $A_4$.

This being so, the cables $KP_1$, $KP_2$ and $KP_3$ are connected to the inputs of five demodulation arrangements $T_1$ to $T_4$ which restore to standardised frequency, for example 60–108 kc/s, the primary groups $GP_1$ to $GP_5$ carried by these cables.

The 12 outputs of the devices $T_1$ to $T_4$ which supply the 12 primary groups to be exchanged are connected to the inputs of a distribution frame R which distributes them in four sets of groups intended for $AF_1$, $AF_2$, $AF_3$ and $AF_4$ respectively. The groups of the four sets are applied respectively to four modulation arrangements $T'_1$ to $T'_4$ which retranspose the primary groups which they receive to the locations which they must occupy in the secondary groups to be retransmitted. The carrier current generating system and the corresponding inputs of the devices T and T' have been omitted from the figure to avoid overcrowding the drawing. The outputs of the arrangements $T'_1$ to $T'_4$ supply respectively the sum of the retransposed primary groups intended for the cables $AF_1$ to $AF_4$ at four outputs connected respectively to a fourth input of the couplers $C_1$ to $C_4$ ($C_2$, $C_3$ and $C_4$ included in the circuits 202, 203, 204) feeding the cables $AF_1$ to $AF_4$.

The other eight primary output groups of the arrangements $T_1$ to $T_4$ feed a modulation arrangement $T_o$ which transposes them and regroups them so that they constitute the eight primary groups forming with those of the cable $AP_5$ a complete MSG. The output of the arrangement $T_o$ and the cable $AP_5$ feed a regrouping and distribution coupler $CD_E$ supplying a complete MSG at each of the 60 channel circuits $W_j$ ($j = 1, 2 \ldots 60$) grouped in a frame B, which will be called a reflex frame. These channel circuits W are different from the channel circuits V hitherto used.

Figure 5:
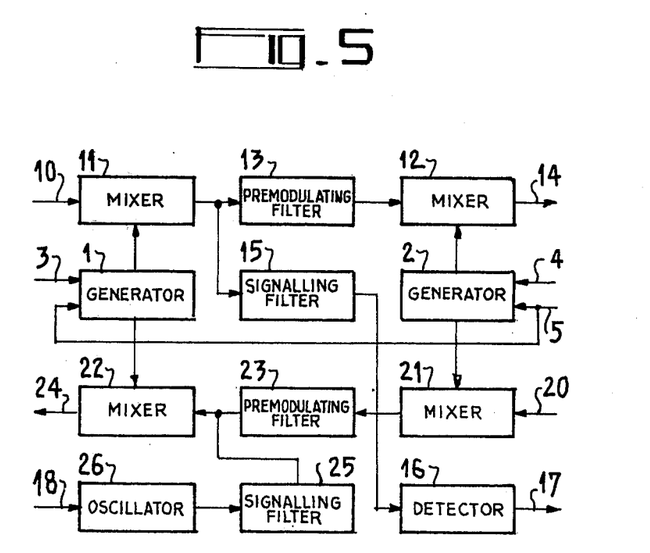
FIG. 5 is a channel circuit having two programmable generators, There are shown in solid lines in FIG. 1 a channel circuit as employed in a switching multiplexer according to the invention, when the telephone channels involved have no singalling channel associated therewith, the signalling then being effected by means of a semaphore channel.

Such a channel circuit W is illustrated in FIG. 5. This circuit is distinguished from that of FIG. 1 in that the mixers 11 and 22 are no longer fed by an input 19 at premodulation frequency, but by a programmable generator 1, identical to the generator 2 of the channel circuit, receiving the same reference frequency $F_o$ through the input 5, and comprising a frequency control input 3. The input 19 is therefore omitted. The other elements are denoted by the same reference numerals as in the case of the circuit of FIG. 1.

In principle, the channel circuit of FIG. 5 may or may not comprise the signalling elements 15, 16, 17, 25, 26, 18, like that of FIG. 1. (In addition, these elements may not only exist singly but may be duplicated, when it is desired to make the channels interchangeable, in the sense that there may be connected to the input of the mixer 12 a series arrangement identical to the arrangement 18, 26 and 25, and the output of the mixer 21 may feed a series arrangement identical to the arrangement 15, 16, 17). The circuits $W_1$ to $W_{24}$ used in the diagram of FIG. 4 have simple signalling elements, while the others $W_{25}$ to $W_{60}$ may comprise signalling elements, but if they are present they are not used.

Referring again to FIG. 4, the coupler $CD_E$ is more precisely connected to the inputs 10 and 20 of the 60 channel circuits W, while the outputs 14 and 24 of these channel circuits are connected to a regrouping coupler $C_S$.

There is denoted by $J_i$ ($i<61$) a junction consisting of an input 10 and an output 24, and by $J_k$ ($k>60$) a junction consisting of an output 14 and an input 20 of a channel circuit W.

The frame B is used for the additional exchanges between the arteries $A_1$ to $A_4$ and for all the exchanges between the latter and the artery $A_5$. Considering a channel circuit W, and assuming that its generator 1 has the frequency $P_x$ corresponding to the carrier frequency $F_x$, of a channel $V_x$ of the input MSG, and that its generator 2 has the frequency $P_y$ corresponding to the carrier frequency $F_y$ of a channel $V_y$ of the output MSG which will be formed by $C_S$, it will be seen that this channel circuit transposes the channel $V_x$ of the input MSG to the channel $V_y$ of the output MSG and vice versa.

The items of information necessary for organising these transpositions with a view to exchanges between arteries are supplied to the control logic circuit by the semaphore channel circuits $V_o$ of the terminal circuits of the arteries $A_1$ to $A_4$, and by the outputs 17 of the channel circuits $W_1$ to $W_{24}$ combined to form a bundle 117. The generators 1 of these channel circuits $W_1$ to $W_{24}$ continuously have the frequencies $P_1$ to $P_{24}$ respectively, and consequently those circuits select the channels of the artery $A_5$. The other generators 1 and all the generators 2 of the channel circuit are blocked in the absence of a connection established by means of the channel circuit with which they are associated, and in the contrary case a frequency assigned by the control logic circuit, in such manner that the 120 generators 1 and 2 have the 120 frequencies P, when they are all unblocked.

The output coupler $CD_S$ supplies a complete or an incomplete MSG depending upon whether or not all the channel circuits W are used. This MSG is applied to a primary group distributing device $T'_o$ which supplies at five outputs respectively two primary groups intended for each of the cables $AF_1$, $AF_2$, $AF_3$, $AF_4$ and $AF_5$, these outputs being connected respectively to inputs of the couplers $C_1$, $C_2$, $C_3$, $C_4$ ($C_2$, $C_3$ and $C_4$ included in the circuits 202, 203, 204) and to the cable $AF_5$.

$T'_o$ comprises in series a demodulating arrangement which splits the MSG which it receives into 10 primary groups, a distribution frame and a modulating arrangement, all those operating on groups of 12 channels.

There will be denoted by $Q(m,q)$ a subscriber of the network connected to the decentralised section $SD_m$ of the artery $A_q$ ($q = 1, 2$ or $3$) and by $Q(4)$ a subscriber of the network served by $A_4$.

The events occur as follows.

Each time a decentralised section is involved, the control logic circuit of the transit centre, seeks a channel circuit $V_j$ which is free in this decentralised section (henceforth, this obvious stage will be taken for granted).

This being so, the subscribers' calls are serviced by the use of the channels of the primary groups exchanged as a whole, when vacant channels are available, and thereafter by using the channels of the residual groups.

1. In the case of a call from a subscriber $Q(m,q)$ for a subscriber $Q(m',q)$ of the same artery having multiple access points, the events occurring are the same as in the case of FIG. 3, except that the frequency $P_x$ assigned to the generator 2 of the channel circuit of $SD_m$ connected to the subscriber $Q(m,q)$ is chosen to correspond to an available channel of the group 60–300 kc/s, and the frequency assigned to the generator 2 of the channel circuit of $SD_m$, connected to the subscriber $Q(m',q)$, will be $P_{121-x}$. This does not involve the intervention of the channel circuits $Wi$.

2. If a subscriber $Q(m,q)$ calls a subscriber $Q(m',q')$ served by another artery having multiple access points, the control logic circuit seeks frequencies $F_x$ and $F_y$ respectively which are available in the primary groups assigned to such calls at $A_q$ and $A_q$, and assings the corresponding frequencies $P_x$ and $P_y$ to the corresponding channel circuits of the decentralised sections.

If there is no free channel in those primary groups, the control logic circuit seeks an available channel of frequency $F_x$ in one of the two residual groups of $AP_q$ and a free channel $F_y$ in one of the two residual groups of $AF_q$. Since there is made to correspond, by means of the device $T_o$, to any frequency $F_x$ of a residual group a known frequency $F_{x(1)}$ in the MSG applied to the coupler $CD_E$, and there is made to correspond, by the device $T'_o$, to any frequency $F_{y(2)}$ applied to the coupler $C_S$ a known frequency $F_y$ of a residual group carried by $AF_q$, the logic element assigns to one of its generators, after having sought a free channel circuit $W_z$, the frequency P corresponding to $F_{x(1)}$ and to the other the frequency P corresponding to $F_{y(2)}$.

3. If a subscriber $Q(m,q)$ calls a subscriber $Q(4)$ or vice versa, the events occurring are the same as those in the case 2), the local multiplexing section of $A_4$ performing the same function as a decentralised section.

4. If a subscriber served by an artery having multiple access points or by the local artery $A_4$ calls an outside subscriber, the control logic circuit necessarily utilises for this a free carrier frequency $F_x$ of one of the two residual groups carried by $AP_r$ ($r = 1, 2, 3$ or $4$). It knows from its signalling connections with the channel circuits $W_1$ to $W_{24}$ the free channels in $AF_5$. It chooses therefrom one $F_y$ and utilises that one, $W_y$, of the channel circuits $W_1$ to $W_{24}$ whose generator 1 has the frequency $F_y$. It gives the generator 2 of this same channel circuit the frequency p corresponding to the frequency $F_{x(1)}$ resulting from the transposition of $F_x$ by $T_o$, and inserts the corresponding signalling at the input 18 of the channel circuit $W_y$, the inputs 18 of the channel circuits $W_1$ to $W_{24}$ being combined in the figure in the form of a bundle 118.

5. If the call emanates from a channel carried by $AP_5$ for a subscriber served by $A_r$ ($r = 1, 2, 3$ or $4$) and it is detected at the output 17 of the corresponding channel circuit W, say $W_t$. After the search for an available channel $F_x$ of a residual group carrier by $AF_r$ and determination of the corresponding frequency $F_{x(2)}$, the control logic circuit gives the generator 2 of $W_t$ the frequency P corresponding to $F_{x(2)}$.

It will be noted that in the system which has been described no specific primary group has been provided for calls from a subscriber served by an artery having multiple access points intended for a subscriber of the same artery. In fact, and this gives great flexibility in this respect, such communications can utilize any channel $F_x$ of the group 60–300 kc/s (with the associated frequency $F_{121-x}$).

It is sufficient for the frequency $F_x$ to be free, be it a frequency belonging to a residual group or to a group intended for total exchange between two different arteries, since the necessary frequency transposition is effected on the independent frequency transposition arrangement of the artery serving the two subscribers, while the other frequency transposition, which might be effected in a device $T'$ to the frequency $F_x$, will give rise to a channel which will be received by no one.

However, if it is desired to avoid a situation in which the arteries having multiple access points have to carry two secondary groups (or more generally two sub-sets of channels which are transposed one into the other), it is possible to omit the independent frequency transposition arrangements of these arteries, and to deal with a telephone communication between two subscribers served by $A_1$, for example, by means of channels selected from a primary group reserved for such communications, and/or from residual groups, this taking place in both cases in the same way as for a channel switching in which two subscribers served by two different arteries are connected.

Of course, the invention is not limited to the embodiments described and illustrated. The arteries may be arteries comprising cables of any known type or radio beams.

All the arteries could carry independent signalling channels, but this involves the function of the control logic circuit being decentralised.

Finally, in the case of larger sets of channels, it would be possible to use more than one reflex frame, for example one reserved for simple exchanges between $A_1$, $A_2$, $A_3$ and $A_4$ and the other for exchanges between $A_5$ and all the other arteries. In this case, however, the choice of the groups $A_1$, $A_2$, $A_3$, $A_4$ applied to each of the reflex frames already results from statistical considerations and consequently does not eliminate to possibility of blocking even with available channels.

It will be observed that the artery according to the invention always comprises M, M ≥ 3 access points.

Each of those M points may be provided with a multiplexing-demultiplexing switching device as in the case of FIG. 3, in which case its terminal arrangement necessarily applies to the second transmission channel, preferably frequency-translated, the telephone channels from the first transmission channel.

The artery may also comprise, as is the case for the multiple access points arteries of the network of FIG. 4, a first terminal access where groups of channels are globally extracted and inserted, and (M-1) access points with a multiplexing-demultiplexing switching device.

The artery could also comprise two terminal access points where groups of channels are globally extracted and inserted, and (M-2) access points with a multiplexing and demultiplexing device.

What is claimed, is:

1. A two-way telephone artery, having first and second terminals, for transmitting in each direction channels forming part of a predetermined multiplexed set of g channels in a telephone system using premodulation and single sideband frequency multiplexing, said set of channels being such that any of its channels may be selectively translated into the pass-band of a premodulation filter by means of a mixer receiving said set and a carrier current associated with this channel, said artery having first and second transmission channels for transmitting telephone communication in first and second directions, and M access points, M at least equal to 3, at m of which, $1 \leq m \leq M$, m multiplexing and demultiplexing switching devices are respectively coupled to said artery for selectively inserting telephone channels in the group of channels transmitted by said first transmission channel at vacant positions of said set and selectively extracting telephone channels from the group of channels transmitted by said second transmission channel, the inserted and extracted telephone channels occupying the same frequency bands in said transmission channels, the $i^{th}$ switching device ($i = 1, 2 \ldots m$) starting from said first terminal comprising $p_i$, $1 \leq p_i \leq g$ telephone channel circuits, each of said telephone channel circuits comprising first and second branches, said first branch comprising, in series, an input mixer having a first input, forming a first input of this channel circuit, for receiving a low frequency channel, and a carrier current input for receiving a current at the premodulation frequency, a premodulation filter having an output, and an output mixer having a first input coupled to said output of said premodulation filter, a carrier current input, and an output forming a first output of this channel circuit, said second branch comprising in series an input mixer having a first input forming a second input of this channel circuit and a carrier current input, a premodulation filter having an output, and an output mixer having a first input coupled to said output of said premodulation filter of said second branch, a carrier current input for receiving said current at the premodulation frequency and an output forming a second output of this channel circuit, each of said telephone channel circuits further comprising a digitally controllable variable frequency generator having an output connected to the carrier current inputs of said output mixer of said first branch and of said input mixer of said second branch, said $i^{th}$ switching device further comprising, for $i < m$, a regrouping coupling device having inputs and an output, inserted by an input and its output in said first transmission channel, and having $p_i$ other inputs connected respectively to the first outputs of said $p_i$ telephone channel circuits, and a distribution coupling device having an input and outputs, inserted by its input and an output in said second transmission channel, and having $p_i$ other outputs connected respectively to the second inputs of said $p_i$ telephone channel circuits, said artery further comprising at said first terminal a terminal arrangement having an input coupled to said first transmission channel and an output coupled to said second transmission channel; the first inputs and second outputs of the $p_m$ channels of the $m^{th}$ switching device being respectively coupled to said first and second transmission channel of said artery at said second terminal through regrouping and distribution coupling devices respectively.

2. A two-way telephone artery as claimed in claim 1, wherein said terminal arrangement comprises a frequency translating arrangement for translating into its own band the set of telephone channels supplied by said first transmission channel, said second transmission channel being coupled to said frequency translating arrangement for receiving therefrom the frequency translated set of telephone channels.

3. A two-way telephone artery as claimed in claim 1, wherein the signalling of the telephone channels transmitted by said artery being effected by means of a semaphore channel, each of said switching devices comprises a semaphore channel circuit identical with that of said telephone channel circuits, each of said distribution coupling devices has an additional output coupled to the second input of said semaphore channel circuit, and each of said regrouping coupling devices has an additional input coupled to the first output of said semaphore channel circuit.

4. A telephone network comprising a transit centre and q two-way telephone arteries $A_i$ ($i = 1, 2 \ldots q$), each comprising a first transmission channel terminating at said centre and a second transmission channel originating at said centre, $r$ ($1 \leq r \leq q$) arteries $A_j$ ($j = 1, 2 \ldots r$) of said q arteries $A_i$ being arteries as claimed in claim 1, having their terminal arrangement at said centre, each of said q arteries having in each direction a transmission capacity equal to a whole number of multiplexed groups of n, n > 1, multiplexed telephone channels; said centre comprising first and second central switching arrangements coupled to the terminal arrangements of said r arteries $A_j$, and to the transmission channels of the other (q-r) arteries $A_i$, said first central switching arrangement comprising means for switching the telephone channels of $N_1$ predetermined ones, hereinafter referred to as the first $N_1$ groups, of the N groups transmitted to said centre by the first transmission channels of said of arteries, to $N_1$ predetermined ones, hereinafter referred to as the second $N_1$ groups, of the N groups to be transmitted by the second transmission channels of said q arteries, with the channels of each one of said first $N_1$ groups being transfered globally to one of said second $N_1$ groups, said second central switching arrangement being for switching the telephone channel of $N_2$ further predetermined ones, hereinafter referred to as first residual groups, of the N groups transmitted to said centre by the first transmission channels of said q arteries, to $N_2$ further predetermined ones, hereinafter referred to as second residual groups, of the N groups to be transmitted by the second transmission channels of said $q$ arteries, said second central switching arrangement comprising:

means, including demodulating means for delivering groups of n channels, and modulating means and regrouping means, for deriving from said first residual groups a larger group of $N_2n$ multiplexed channels; $(N_2n)/2$ channel circuits of a second type, each of which comprises first and second branches, said first branch comprising, in series, an input mixer having a first input, forming a first input of this channel circuit, and a carrier current input, a premodulation filter having an output, and an output mixer having a first input coupled to said output of said premodulation filter, a carrier current input, and an input forming a first output of this channel circuit, said second branch comprising in series an input mixer having a first input forming a second input of this channel circuit and a carrier current input, a premodulation filter having an output, and an output mixer having a first input coupled to said output of said premodulation filter of said second branch, a carrier current input and an output forming a second output of this channel circuit, and first and second, digitally controllable variable frequency generators having respective outputs, the output of said first generator being coupled to the carrier current inputs of said input mixer of said first branch, and of said output mixer of said second branch, the output of said second generator being coupled to the carrier current input of said output mixer of said first branch and of said input mixer of said second branch; means for applying said larger group to the two inputs of each one of said second type channel circuits; a regrouping coupling device having $N_2n$ inputs respectively coupled to the two outputs of each one of said second type channel circuits; and means for deriving said $N_2$ second residual groups from the output signal of said regrouping coupling device with $N_2n$ inputs, said last mentioned means comprising demodulating means for deriving from this output signal $N_2$ groups of n channel, and distributing and modulating means operating on said last mentioned $N_2$ groups.

5. A network as claimed in claim 4, wherein $N = N_1 + N_2$.

6. A network as claimed in claim 4, wherein the two transmission channels of the artery $A_j$ ($j = 1, 2 \ldots r$) are each for transmitting first and second sub-sets of $U_j$ groups of n channels, wherein the terminal arrangement of the artery $A_j$ comprises frequency translating means for translating the groups of each of the sub-sets supplied by the first transmission channel of this artery into the other sub-set, and means for delivering the frequency translated groups to the second transmission channel of this artery, the groups of the second sub-set transmitted by the first transmission channel of each one of said $r$ arteries forming part neither of said $Ni$ first groups, nor of said first residual groups, the groups of said second sub-set transmitted by the second transmission channel of each one of said r arteries forming part of neither said second $N_1$ groups nor of said second residual groups, whereby $N_1 + N_2 = N - \Sigma_j U_j$.

* * * * *